United States Patent
Xue

(10) Patent No.: US 6,201,511 B1
(45) Date of Patent: Mar. 13, 2001

(54) COMPOSITE ANTENNA FOR DUPLEXER-FREE DUPLEX OPERATION TERMINALS AND METHOD

(75) Inventor: Hongxi Xue, Forest, VA (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 08/838,066

(22) Filed: Apr. 18, 1997

(51) Int. Cl.[7] .................... H01Q 21/10; H01Q 21/00; H01Q 1/42; H01Q 7/00
(52) U.S. Cl. .................... 343/827; 343/853; 343/872; 343/870; 343/723; 343/751; 343/827
(58) Field of Search .................... 370/278, 276, 370/279; 342/160, 202, 27; 343/820, 827, 700, 853, 872, 900, 813, 723, 751, 729; 375/267; 359/333; 73/432.1; 235/462.13; 455/78, 80, 24

(56) References Cited

U.S. PATENT DOCUMENTS

| | | | |
|---|---|---|---|
| 3,806,804 | * | 4/1974 | Mills et al. .................... 325/55 |
| 4,520,476 | * | 5/1985 | Searl .................... 370/278 |
| 4,952,193 | | 8/1990 | Talwar . |
| 4,991,165 | | 2/1991 | Cronyn . |
| 5,227,784 | * | 7/1993 | Masamori et al. .................... 340/903 |
| 5,315,096 | * | 5/1994 | Muller et al. .................... 235/462.13 |
| 5,321,409 | * | 6/1994 | Walker .................... 342/202 |
| 5,581,268 | * | 12/1996 | Hirshfield .................... 343/853 |
| 5,589,843 | * | 12/1996 | Meredith et al. .................... 343/820 |

FOREIGN PATENT DOCUMENTS

| | | |
|---|---|---|
| 0 767 508 | 4/1997 | (EP) . |
| 2 270 444 | 3/1994 | (GB) . |
| 2270444 * | 9/1994 | (GB) . |

OTHER PUBLICATIONS

John Almeida, "The ARRL Antenna Book" pp. 17–1 thur 17–7 Published by The American Radio Relay League 1988.*

* cited by examiner

Primary Examiner—Chi H. Pham
Assistant Examiner—Brenda H. Pham
(74) Attorney, Agent, or Firm—Nixon & Vanderhye P.C.

(57) ABSTRACT

An antenna assembly includes a receiving antenna and a separate transmitting antenna with an isolation circuit disposed in between to thereby isolate the Tx and Rx signals and provide a sufficient amount of attenuation outside the desired frequency band. The dual antenna structure enables the elimination of a conventional duplexer for duplex operation. In this context, the arrangement minimizes occupied space on the PCB while reducing manufacturing costs.

13 Claims, 2 Drawing Sheets

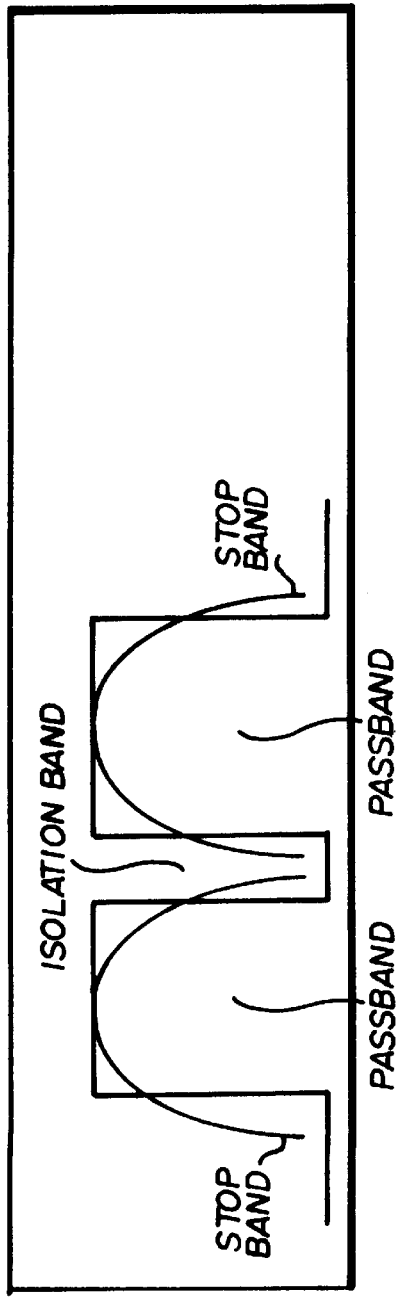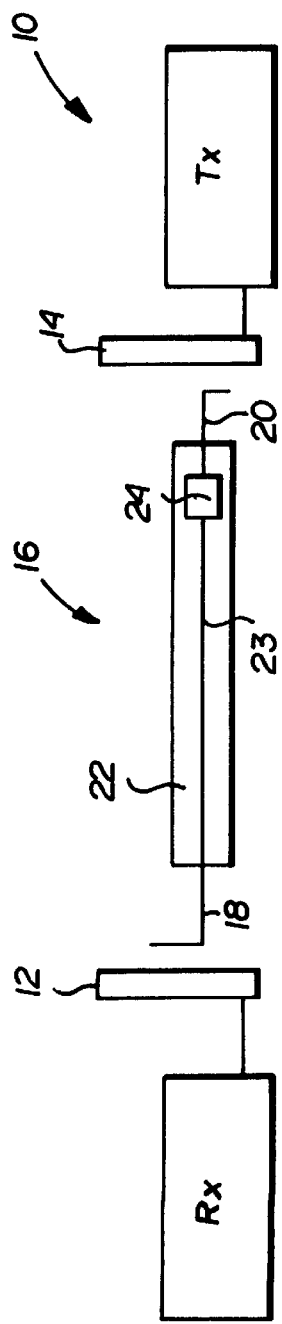

Rx  Tx

COMPOSITE ANTENNA FOR DUPLEXER-FREE DUPLEX OPERATION TERMINALS AND METHOD

BACKGROUND OF THE INVENTION

In a full-duplex radio with a fixed frequency offset, a duplexer is typically required to enable full duplex operation. Conventional duplexers, however, are normally made of ceramic filters, which are bulky and provide only a limited amount of isolation. As the size of communication terminals is getting smaller, the size and significant cost of the conventional duplexer is a concern that must be addressed.

FIG. 1 depicts the operation of a duplexer, which provides a minimum amount of insertion loss in the desired pass band, a sufficient amount of isolation between the Tx and Rx signals, and a sufficient amount of attenuation outside the desired frequency band. The illustrated configuration requires only one antenna for both transmitting and receiving. The use of a single antenna, however, has certain drawbacks. In particular, the antenna must be broadband, covering both Tx and Rx frequencies. As a result, the antenna has low antenna gain with poor VSWR (voltage standing wave ratio) performance. In addition, the single antenna requires the duplexer, which as noted above is space consuming and expensive.

SUMMARY OF THE INVENTION

It is an object of the invention to provide for duplex operation without requiring the conventional duplexer structure. By using separate antennas, one for transmitting and one for receiving, the antennas can be narrowband, which will provide a relatively higher gain and better match to the transceiving circuitry. In addition, with proper arrangement, the composite antenna will also provide full duplex operation without a duplexer. Consequently, space and cost issues associated with the conventional duplexer arrangement are overcome. Moreover, since the bandwidth per antenna (Tx or Rx) is narrower, it will be easier to make dual band antennas, which in fact may eliminate two duplexers from the dual band communications terminal.

In an exemplary embodiment according to the present invention, there is provided an antenna unit for a communications apparatus. The antenna unit includes a transmitting antenna, a receiving antenna, and an isolation circuit disposed coupled with the transmitting antenna and the receiving antenna. The isolation circuit isolates a transmit antenna signal from the receiving antenna. The antenna unit may further include a directional coupler disposed coupling the transmitting antenna and the receiving antenna to the isolation circuit. The coupler couples signal energy off of the transmitting antenna and feeds the energy to the isolation circuit. The isolation circuit may be provided with phase adjusting structure receiving the energy from the coupler. The phase adjusting structure serves to adjust a phase of the signal. The isolation circuit may further be provided with amplitude adjusting structure coupled with the phase adjusting structure. In this context, the amplitude adjusting structure serves to adjust an amplitude of the signal.

In one arrangement, the transmitting antenna and the receiving antenna are disposed substantially co-linear in a single casing. In another arrangement, one of the transmitting antenna and the receiving antenna is disposed in a casing and the other of the transmitting antenna and the receiving antenna is attachable to an apparatus housing.

In accordance with another aspect of the invention, there is provided a method of emitting and receiving a signal with a communications device. The method includes the step of isolating with the isolation circuit a transmit antenna signal from the receiving antenna without a duplexer. The method may further include the steps of coupling signal energy off of the transmitting antenna and feeding the energy to the isolation circuit. The method may still further include the step of adjusting with the isolation circuit a phase of the signal, and adjusting with the isolation circuit an amplitude of the signal.

BRIEF DESCRIPTION OF THE DRAWINGS

These and other aspects and advantages of the present invention will be described in detail with reference to the accompanying drawings, in which:

FIG. 1 illustrates the conventional operation of a duplexer;

FIG. 2 is a schematic illustration of the duplexer free duplex antenna according to the present invention.

DETAILED DESCRIPTION OF PREFERRED EMBODIMENTS

Figure 3:
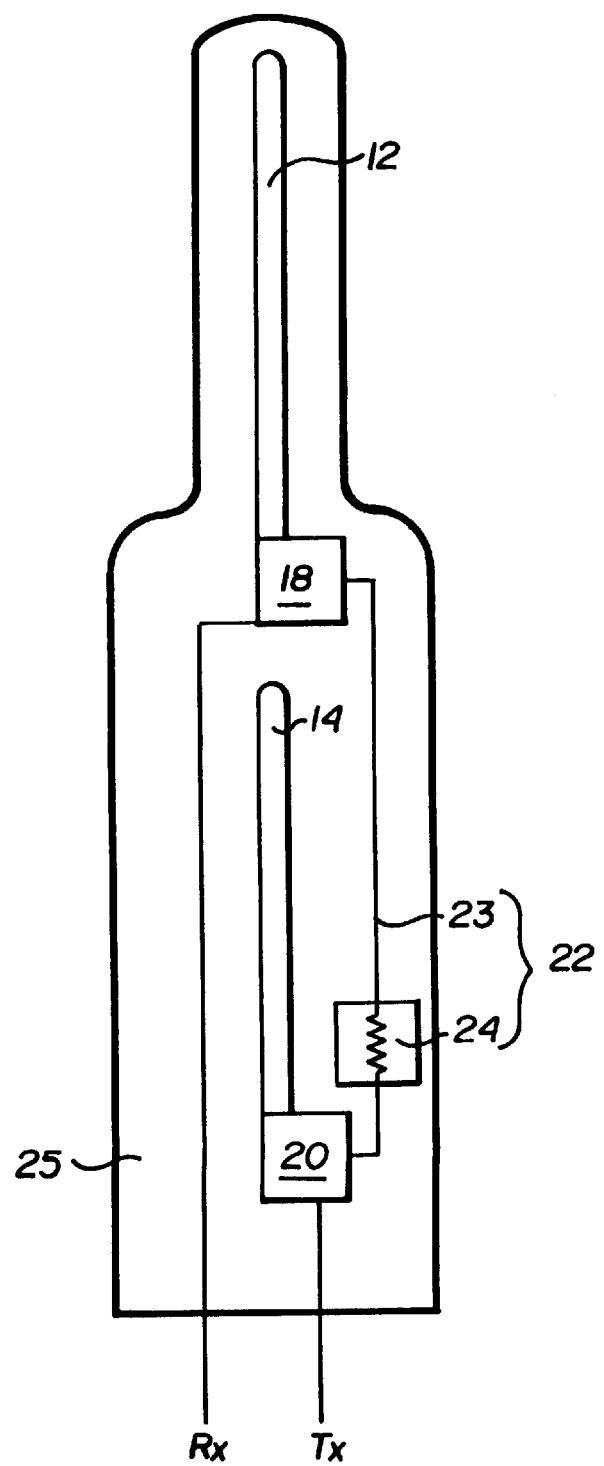
FIG. 3 illustrates an alternative arrangement of the duplexer free duplex antenna according to the invention.

A shown schematically in FIG. 2 and with reference to FIG. 3, the antenna assembly 10 according to the present invention includes a receiving Rx antenna 12 and a separate transmitting Tx antenna 14. An isolation circuit 16 is disposed between the Rx antenna 12 and the Tx antenna 14 and serves to couple and cancel the Tx antenna energy to ensure that the required isolation between the Tx antenna and the Rx antenna is maintained.

The isolation circuit 16 includes two directional couplers 18, 20, which are provided with appropriate delay/attenuation in between. That is, a small portion of the Tx antenna 14 signal is sampled by the Tx side coupler 20, and the signal is appropriately delayed and attenuated and directed to the Rx antenna 12 by the Rx side coupler 18 such that the Tx antenna signal coupled in from the Rx antenna will be cancelled with Tx signal fed in through the coupler 18 at the Rx antenna 12.

The couplers 18, 20 can be formed as a printed wire on the printed wiring board (PWB). The isolator circuitry 22 is formed of a transmission line 23 and an attenuator 24 on the PWB and receives the signal from the Tx side coupler 20 and adjusts the phase of the signal and the amplitude of the signal by virtue of the attenuator 24 and the length of the transmission line 23. With a fixed antenna assembly, the signal values will be consistent, and the line length can be fixed. The calculation of the line length for the isolator circuitry 22 is configured using known principles based on measurements of the phase and amplitude of the signal received by the Rx antenna 12.

The principal of the present invention can be described with reference to mathematical principles. Ideally, the signal energy sampled from the Tx antenna 14 and directed to the Rx antenna 12 should exactly cancel out the signal energy received by the Rx antenna 12 from the Tx antenna 14. These mathematical principles are well known to those of ordinary skill in the art and will not be further described.

By using the dual antenna arrangement, narrow band antennas can be used, which allow better match between the transceiver and the antenna (Rx band and Tx band is narrower than the two combined). Moreover, because of the large frequency offset between the two antennas (minimum 10 MHz), a natural isolation of at least 20 d B will result.

Consequently, the isolator circuitry 22 need only provide an additional 20 d B for effective isolation.

As shown in FIG. 3, the antennas with associated cancellation circuitry can be made as a single entity. That is, the components of the antenna assembly 10 can be molded together in a single antenna casing 25. Alternatively, one of the antennas may be disposed in an antenna casing such as a conventional whip antenna while the other is attachable to the communications apparatus housing. The antennas can be dual band (e.g., 800 MHz and 1900 MHz).

Thus, in accordance with the structure of the present invention, the conventional duplexer can be eliminated in favor of less space consuming and less expensive isolation circuitry coupled between independent transmitting and receiving antennas.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An antenna unit for a hand-held communications apparatus, comprising:

a transmitting antenna;

a receiving antenna; and an isolation circuit disposed coupled between said transmitting antenna and said receiving antenna, said isolation circuit isolating a transmit antenna signal from said receiving antenna, wherein said transmitting antenna and said receiving antenna are disposed substantially co-linear in a single casing.

2. An antenna unit according to claim 1, further comprising a pair of directional couplers disposed coupling said transmitting antenna and said receiving antenna to said isolation circuit, respectively, said couplers coupling signal energy off of said transmitting antenna and feeding the energy through said isolation circuit to said receiving antenna.

3. An antenna unit according to claim 2, wherein said isolation circuit comprises phase adjusting structure receiving the energy from said transmit side coupler, said phase adjusting structure adjusting a phase of the signal.

4. An antenna unit according to claim 3, wherein said isolation circuit further comprises amplitude adjusting structure coupled with said phase adjusting structure, said amplitude adjusting structure adjusting an amplitude of the signal.

5. An antenna unit for a hand-held communications apparatus, comprising:

a transmitting antenna;

a receiving antenna; and isolating means for isolating a transmit antenna signal from said receiving antenna, wherein said transmitting antenna and said receiving antenna are disposed substantially co-linear in a single casing.

6. An antenna unit according to claim 5, further comprising means for coupling signal energy off of said transmitting antenna and for feeding the energy through said isolating means to said receiving antenna.

7. An antenna unit according to claim 6, wherein said isolating means comprises means receiving the energy from said coupling means for adjusting a phase of the signal.

8. An antenna unit according to claim 7, wherein said isolating means further comprises means coupled with said phase adjusting means for adjusting an amplitude of the signal.

9. A method of emitting and receiving a signal with a hand-held communications device, the communications device including a transmitting antenna, a receiving antenna, and an isolation circuit disposed coupled between the transmitting antenna and the receiving antenna, the method comprising the steps of disposing the transmitting antenna and the receiving antenna substantially co-linear in a single casing and isolating with the isolation circuit a transmit antenna signal from the receiving antenna without a duplexer.

10. A method according to claim 9, further comprising the steps of coupling signal energy off of the transmitting antenna and feeding the energy through the isolation circuit to the receiving antenna.

11. A method according to claim 9, further comprising the step of adjusting with the isolation circuit a phase of the signal.

12. A method according to claim 11, further comprising the step of adjusting with the isolation circuit an amplitude of the signal.

13. An antenna unit for a communications apparatus, comprising:

a transmitting antenna;

a receiving antenna; and an isolation circuit disposed coupled between said transmitting antenna and said receiving antenna, said isolation circuit isolating a transmit antenna signal from said receiving antenna, wherein said transmitting antenna and said receiving antenna are disposed substantially co-linear, and wherein one of said transmitting antenna and said receiving antenna is disposed in a casing and the other of said transmitting antenna and said receiving antenna is attachable to an apparatus housing.

* * * * *